United States Patent
Roffe et al.

(10) Patent No.: US 11,209,048 B1
(45) Date of Patent: Dec. 28, 2021

(54) LIGHT WEIGHT, HIGH FREQUENCY WELDED, 2-PIECE BALL BEARING CAGE ASSEMBLY

(71) Applicant: Schaeffler Technologies AG & Co. KG, Herzogenaurach (DE)

(72) Inventors: Dennis Roffe, Fort Mill, SC (US); Michael Heaton, Rock Hill, SC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/999,679

(22) Filed: Aug. 21, 2020

(51) Int. Cl.
*F16C 33/38* (2006.01)
*F16C 19/16* (2006.01)
*F16C 43/06* (2006.01)
*B21D 53/12* (2006.01)

(52) U.S. Cl.
CPC ........ *F16C 33/3862* (2013.01); *B21D 53/12* (2013.01); *F16C 19/16* (2013.01); *F16C 43/065* (2013.01); *F16C 2226/38* (2013.01)

(58) Field of Classification Search
CPC ............ F16C 33/3862; F16C 33/3868; F16C 33/3875; F16C 2226/38; F16C 43/06; F16C 43/065; F16C 19/16; B21D 53/12
See application file for complete search history.

(56) References Cited

U.S. PATENT DOCUMENTS

| 1,825,365 | A | | 9/1931 | Runge | |
|---|---|---|---|---|---|
| 2,360,419 | A | | 10/1944 | Hickling | |
| 4,902,145 | A | * | 2/1990 | Johnson | F16C 33/3875 384/530 |
| 5,131,762 | A | * | 7/1992 | Waskiewicz | F16C 43/06 384/448 |
| 10,975,912 | B1 | * | 4/2021 | Nelson | F16C 33/467 |

FOREIGN PATENT DOCUMENTS

| CN | 111306197 A | * | 6/2020 | |
|---|---|---|---|---|
| JP | 2004360823 A | * | 12/2004 | F16C 33/3862 |
| JP | 2006258172 A | * | 9/2006 | F16C 33/3875 |
| JP | 2007113592 A | * | 5/2007 | F16C 33/3875 |
| JP | 2007198583 A | * | 8/2007 | F16C 33/3875 |
| JP | 2008291881 A | * | 12/2008 | F16C 33/3875 |
| JP | 2009115128 A | * | 5/2009 | F16C 33/3875 |
| JP | 2010038289 A | * | 2/2010 | F16C 33/3875 |

* cited by examiner

*Primary Examiner* — Phillip A Johnson
(74) *Attorney, Agent, or Firm* — Antun Peakovic

(57) ABSTRACT

A two-piece plastic ball bearing cage is designed to handle high-speed applications. Posts on one bearing half fit into holes in the other bearing half After the two halves are brought together, ultrasonic vibration is applied to the ends of the posts. The ultrasonic vibration deforms the post end to fit into a widened portion of the holes and welds material, thereby firmly securing the two cage halves to one another.

12 Claims, 3 Drawing Sheets

LIGHT WEIGHT, HIGH FREQUENCY WELDED, 2-PIECE BALL BEARING CAGE ASSEMBLY

TECHNICAL FIELD

The disclosure applies to the field of ball bearings. In particular, a cage suitable for high speed applications and a corresponding method of assembly are disclosed.

BACKGROUND

Bearing are used to reduce parasitic drag when a component rotates with respect to another component. Roller bearings utilize rolling elements which maintain predominantly rolling contact with races fixed to the respective components. The races may be formed into rings which are fixed to the respective components. The rolling elements may be spaced circumferentially by a cage.

In an effort to reduce fuel consumption, some vehicle powertrains utilize electric motors in addition to or instead of internal combustion engines. Electric motors tend to have higher rotational speeds than internal combustion engines, which increases the stress on bearing cages. Bearing cages capable of withstanding these high speeds and yet being economical to manufacture are needed.

SUMMARY

A bearing includes first and second cage halves. The first cage half has a plurality of posts. The second cage half defines a plurality of holes, wherein the posts extend through the holes. Ends of the posts are ultrasonically welded to the second cage half. Each of the holes may have a narrow portion adjacent to the first cage half and a wider portion. The posts may have been plastically deformed to fill the wider portion. A plurality of balls may be retained between the first and second cage halves. A center of each ball may be a first distance from a central axis. The posts may be arranged in an inner row and an outer row. Posts of the outer row are farther than the first distance from the central axis. Posts of the inner row are closer than the first distance to the central axis. Two posts may be circumferentially located between every pair of adjacent balls. The bearing may also include inner and outer rings having an inner race and an outer race respectively. The plurality of balls may be in rolling contact with the inner race and the outer race.

A method of assembling a bearing includes providing first and second cage halves, bringing the cage halves together, and using ultrasonic vibration to join the cage halves to one another. The first cage half has a plurality of posts. The second cage half defines a plurality of holes. The first cage half and the second cage half are brought together such that the posts extend through the holes. Subjecting ends of the posts to ultrasonic vibration joins the cage halves. The ultrasonic vibration may weld the ends of the posts to the second cage half. Each of the holes may have a narrow portion adjacent to the first cage half and a wider portion. The ultrasonic vibration may plastically deform the posts to fill the wider portion. A plurality of balls may be inserted into pockets of either the first cage half or the second cage half before the cage halves are brought together. A center of each ball may be a first distance from a central axis. The posts may be arranged in an inner row and an outer row. Posts of the outer row may be farther than the first distance from the central axis. Posts of the inner row may be closer than the first distance to the central axis. Two posts may be circumferentially located between every pair of adjacent balls. The balls may be positioned radially between an inner ring and an outer ring before bringing the cage halves together.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
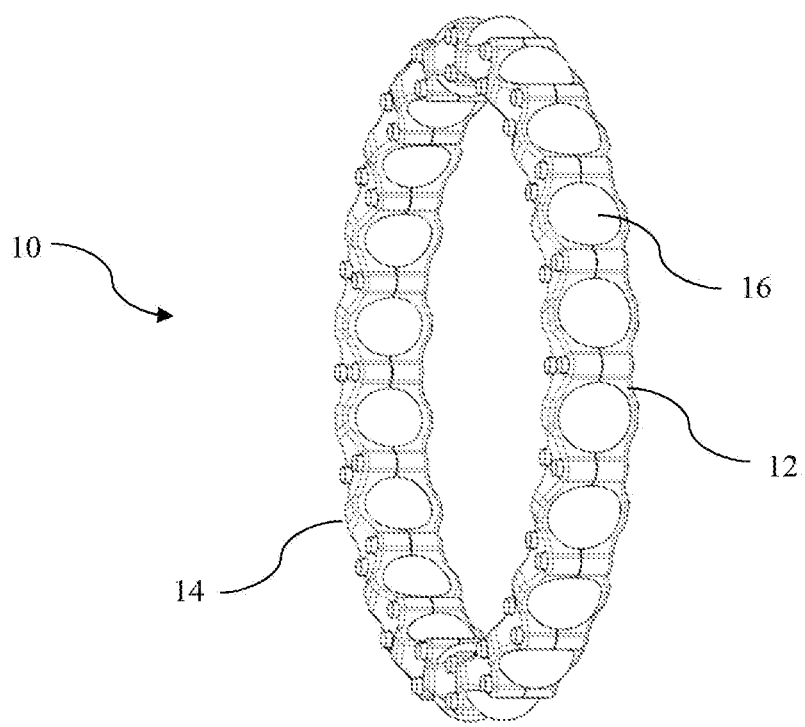
FIG. 1 is a pictorial view of a two-piece bearing cage holding ball rollers.
Figure 2:
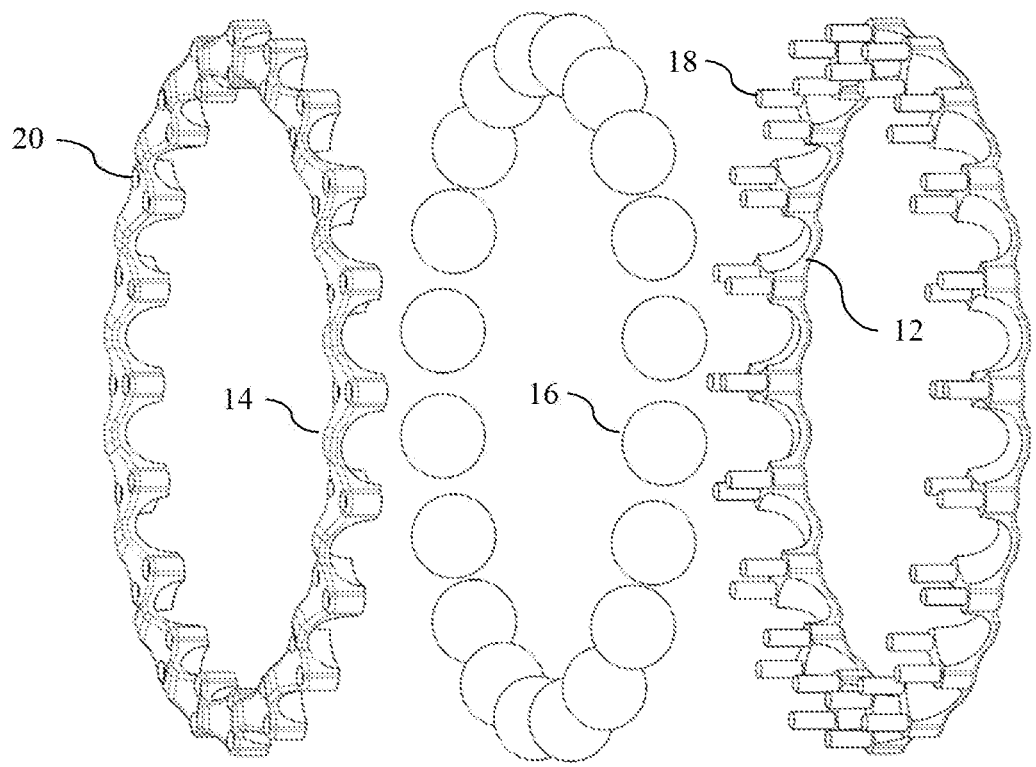
FIG. 2 is an exploded view of the bearing cage and rollers of FIG. 1.

FIG. 1 shows a bearing cage 10 suitable for high-speed applications such as electric traction motors. The cage 10 includes a first cage half 12 and a second cage half 14. A plurality of balls 16 retained between the two cage halves. FIG. 2 shows these components in an exploded view. Notice that first cage half 12 includes a number of posts 18 while second cage half 14 defines a number of corresponding holes 20. During assembly, the posts 18 are inserted through the holes 20. Then, the posts are subjected to ultrasonic vibration which deforms them and welds them to second cage half. This method of securing the cage halves to one another is very robust with respect to the centrifugal loads imposed by high-speed applications.

Figure 3:
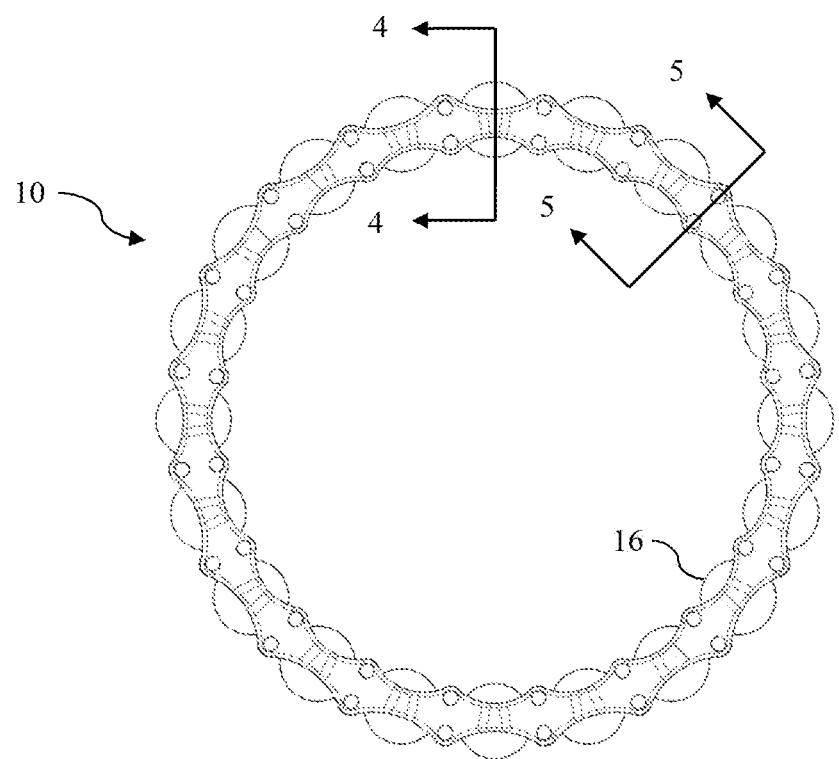
FIG. 3 is an end view of the bearing cage and rollers of FIG. 1.
Figure 4:
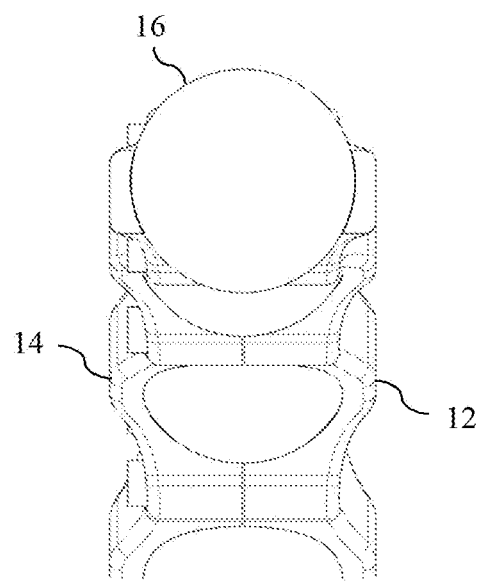
FIG. 4 is a cross sectional view of the bearing cage and rollers of FIG. 1.
Figures 5A, 5B:
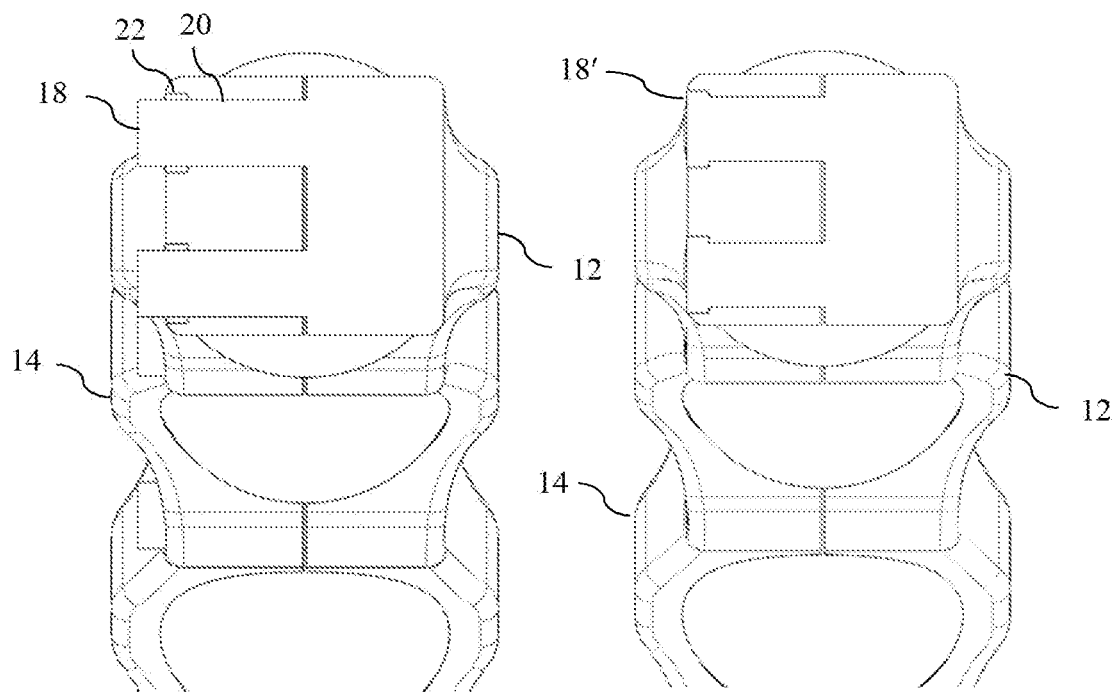
FIG. 5A is a cross sectional view of the bearing cage and rollers of FIG. 1 before ultrasonic welding.
FIG. 5B is a cross sectional view of the bearing cage and rollers of FIG. 1 after ultrasonic welding.

FIG. 3 is an end-view of the cage 10 and balls 16. FIG. 4 is a cross sectional view through the center of one of the balls 16. FIG. 5A is a cross sectional view through a pair of the posts 18 after insertion but before ultrasonic welding. Note that each of the holes includes a widened portion 22 near an outer surface of the second cage half 14. FIG. 5B shows the same view after the ultrasonic welding step. Note that the tip of each of the posts 18' is flattened and conforms to a shape of the hole. Specifically, ends of the posts are widened such that they are prevented from coming out of the holes.

Figure 6:
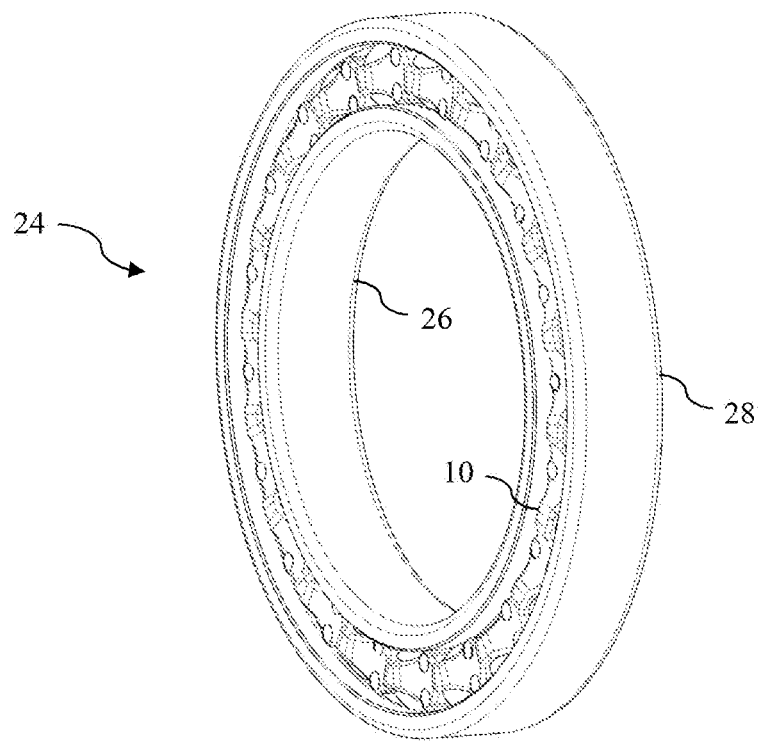
FIG. 6 is a pictorial view of a bearing including the bearing cage and rollers of FIG. 1.

FIG. 6 shows a bearing assembly 24 which includes the cage 10. The bearing assembly also includes an inner ring 26 and an outer ring 28. The inner ring is rotatable with respect to the outer ring. During relative rotation of the rings, the balls maintain predominantly rolling contact with an inner race formed in inner ring 26 and an outer race formed in outer ring 28.

The steps for assembling the bearing assembly are as follows:
(i) Position inner ring 26 inside outer ring 28, but offset toward one side, creating a crescent shaped opening on the opposite side.
(ii) Insert balls between inner ring 26 and outer ring 28 in crescent shaped opening.
(iii) Distribute balls 16 around circumference while adjusting inner ring to be concentric with outer ring.
(iv) Position first cage half 12 with respect to balls 16.
(v) Position second cage half 14 with respect to balls 16 and first cage half 12 such that posts 18 of first cage half extend through holes 20 of second cage half.
(vi) Subject the ends of the exposed ends of the posts to ultrasonic vibration, deforming them to conform to the holes and welding them to the second cage half.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A bearing comprising:
    a first cage half having a plurality of posts;
    a second cage half defining a plurality of holes, wherein the posts extend through the holes and ends of the posts are ultrasonically welded to the second cage half; and
    a plurality of balls retained between the first and second cage halves, wherein a center of each ball is a first distance from a central axis
    wherein the posts are arranged in an inner row and an outer row, posts of the outer row being farther than the first distance from the central axis and posts of the inner row being closer than the first distance to the central axis.

2. The bearing of claim 1 wherein two posts of the plurality of posts are circumferentially located between every pair of adjacent balls.

3. The bearing of claim 1 further comprising:
    an inner ring having an inner race; and
    an outer ring having an outer race, wherein the plurality of balls are in rolling contact with the inner race and the outer race.

4. The bearing of claim 1 wherein each of the holes has a narrow portion adjacent to the first cage half and a wider portion and wherein the posts have been plastically deformed to fill the wider portion.

5. A method of assembling a bearing comprising:
    providing a first cage half having a plurality of posts;
    providing a second cage half defining a plurality of holes extending from a first surface to a second surface;
    bringing the first cage half and the second cage half together such that first surface is in contact with the first cage half and the posts extend through the holes beyond the second surface; and
    subjecting ends of the posts to ultrasonic vibration.

6. The method of claim 5 wherein the ultrasonic vibration welds the ends of the posts to the second cage half.

7. The method of claim 5 wherein:
    each of the holes has a narrow portion adjacent to the first cage half and a wider portion; and
    the ultrasonic vibration plastically deforms the posts to fill the wider portion.

8. The method of claim 5 further comprising inserting a plurality of balls into pockets of one of the first cage half and the second cage half before the cage halves are brought together.

9. The method of claim 8 wherein:
    a center of each ball is a first distance from a central axis; and
    the posts are arranged in an inner row and an outer row, posts of the outer row being farther than the first distance from the central axis and posts of the inner row being closer than the first distance to the central axis.

10. The method of claim 8 wherein two posts of the plurality of posts are circumferentially located between every pair of adjacent balls.

11. The method of claim 8 further comprising positioning the plurality of balls radially between an inner ring and an outer ring before bringing the cage halves together.

12. A bearing comprising:
    a first cage half having a plurality of posts; and
    a second cage half defining a plurality of holes; wherein each of the holes has a narrow portion adjacent to the first cage half and a wider portion adjacent to a surface opposite the first cage half; and
    the posts extend through the holes and ends of the posts are ultrasonically welded to the second cage half and have been plastically deformed to fill the wider portion.

* * * * *